United States Patent [19]

Nelson

[11] Patent Number: 5,083,656
[45] Date of Patent: Jan. 28, 1992

[54] CONVEYOR ANTI-RUNAWAY APPARATUS
[75] Inventor: Lester R. Nelson, Belvidere, Ill.
[73] Assignee: Chrysler Corporation, Highland Park, Mich.
[21] Appl. No.: 640,740
[22] Filed: Jan. 14, 1991
[51] Int. Cl.$^5$ ............................................. B65G 43/00
[52] U.S. Cl. .............................. 198/502.4; 198/832.3; 104/249
[58] Field of Search .......................... 198/502.4, 832.2; 104/249

[56] References Cited
U.S. PATENT DOCUMENTS
3,149,715  9/1964  Massimiani .......................... 104/249
3,948,187  4/1976  Moore ................................ 198/832.2

Primary Examiner—Joseph E. Valenza
Attorney, Agent, or Firm—Edward A. Craig

[57] ABSTRACT

A conveyor anti-runaway apparatus is provided for a conveyor of the type driven by an electric motor connected to a source of electrical power. The anti-runaway apparatus includes a switch tripping device having a tripping arm structure which is periodically bumped by conveyor wheel structure and which is caused to pivot into a switch opening position when the conveyor speed is unacceptably high. The tripping arm structure also functions as a blocking element to prevent conveyor movement. Jackscrew structure is provided to permit rapid disengagement of the tripping arm structure to facilitate restart of the conveyor. A second switch is provided to prevent conveyor restart until the switch tripping device is repositioned in its operative relationship to the conveyor.

6 Claims, 3 Drawing Sheets

CONVEYOR ANTI-RUNAWAY APPARATUS

BACKGROUND OF THE INVENTION

1. Field of Invention

A conveyor anti-runaway apparatus is provided for a conveyor of the type driven by an electric motor connected to a source of electrical power.

2. Prior Art

A common problem which occurs in connection with use of large industrial conveyors, such as those used in automotive assembly plants, is sporadic large increases in conveyor speed. Such speed increases endanger the safety of assembly operators.

In order to resolve this problem, devices termed "conveyor anti-runaways" have been provided. These devices sense, by various means, conveyor chain speeds and detect sudden increases in conveyor speed. Conventionally, such devices automatically physically jam the conveyor chain and stop all movement when the conveyor speed reaches unacceptable levels. Increased conveyor speed can be caused by various conditions. For example, a production part may fall from the conveyor and become wedged between the conveyor chain rollers and the channel that the chain follows. Very large forces can then build up in the conveyor chain drive motor causing the chain to stretch. When the stretching force overcomes the wedged production part, the chain is suddenly released with thousand of pounds of force. In a manner similar to shooting a rubber band, the chain speed increases to dangerous velocities. All assembly workers near the conveyor are endangered as they may be struck and injured by the conveyor or by production parts on the conveyor.

Standard anti-runaway devices have been effective in the past. However, one problem encountered in connection with such devices is that they have required rather extensive time to permit restarting of production. For example, such restart time may be thirty-five minutes with two millwrights and one electrician working together. This down time results in lost production and constitutes a very substantial monetary loss. In accordance with the present invention, a conveyor anti-runaway apparatus is provided which is effective in operation but which requires only a short time to permit restart, for example, about two minutes.

SUMMARY OF THE INVENTION

The conveyor anti-runaway apparatus is provided for a conveyor of the type driven by an electric motor connected to a source of electrical power. The conveyor includes a plurality of spaced apart wheel structures along the length thereof which ride on rails.

The conveyor anti-runaway apparatus comprises a normally closed electric switch connected between the conveyor electric motor and the source of electrical power. The electric switch includes a switch actuator movable between closed and open positions.

A switch tripping device is mounted adjacent the underside of a conveyor rail. A tripping arm structure is pivotably mounted on the switch tripping device intermediate the ends thereof. The tripping arm structure has an upper segment on one side of the pivot mount and a lower segment on the other side of the pivot mount. The lower segment is configured to produce a greater moment about the pivot mount than does the upper segment whereby the tripping arm structure assumes a normal position with the lower segment beneath the upper segment.

A portion of the upper segment extends into the path of the conveyor wheel structures to be bumped thereby and pivot each time a wheel structure passes by. The moment of the lower segment is sufficient to cause the tripping arm structure to return to its normal position each time it is bumped by a wheel structure which is moving at an acceptably low speed. The moment is, however, insufficient to cause such return when the wheel structure is moving at an unacceptably high speed resulting in the lower segment pivoting entirely around the pivot mount into contact with the switch actuator causing the switch actuator to move to the open position thus interrupting electrical power to the electric motor and causing the conveyor to stop. The lower segment thereafter functions to block passage of conveyor wheel structures thereby.

Preferably, the electric switch is mounted on the switch tripping device. The switch tripping device is pivotally mounted on a conveyor rail. Jackscrew support structure including an internally threaded opening depends from the conveyor rail. A jackscrew threadingly extends through the opening. Manually engagable crank means are provided on one end of the jackscrew. The other end of the jackscrew is rotatably connected to the switch tripping device whereby the tripping arm structure is movable out of its wheel structure blocking position by actuation of the jackscrew to pivot the switch tripping device away from the conveyor rail. The tripping arm structure can then be manually pivoted back to its initial position to reset the switch tripping device to permit restarting of the conveyor. In addition to being rotatably connected to the switch tripping device, the other end of the jackscrew is also pivotably connected to the switch tripping device along an axis at substantially right angles with respect to the axis of the rotatable connection.

Preferably, a second electric switch is connected in series with the aforementioned electric switch. The second electric switch includes a second switch actuator biased to a normally open position. The second electric switch is mounted on the conveyor rail adjacent to the switch tripping device. The switch tripping device includes a second tripping arm structure. The second tripping arm structure contacts the second switch actuator and closes the second electric switch when the switch tripping device is positioned by the jackscrew adjacent the underside of the conveyor rail. The second tripping arm structure is out of contact with the second switch actuator when the aforementioned tripping arm structure is moved out of its wheel structure locking position by actuation of the jackscrew whereby the second switch actuator is biased to the open position thereby preventing application of electric power to the electric motor.

Preferably the conveyor rail has an opening therein through which portions of the tripping arm structure project. The switch tripping device preferably includes a stop element positioned beneath and in the path of the lower segment when the tripping arm structure assumes its normal position. The stop element functions to limit downward pivoting of the lower segment.

IN THE DRAWINGS

DETAILED DESCRIPTION OF A PREFERRED EMBODIMENT

Figure 3:
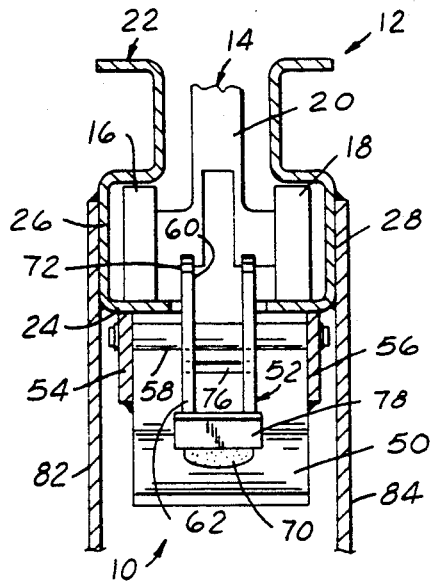
FIG. 3 is a sectional view taken substantially along the line 3—3 of FIG. 2 looking in the direction of the arrows.

The conveyor anti-runaway apparatus 10 of the present invention is adapted for use in connection with a conveyor of the type driven by an electric motor connected to a source of electrical power. The electric motor drives a chain which, in turn, causes transportation of articles carried by the conveyor. Portions of a typical conveyor 12 are illustrated in the present drawings. The conveyor 12 includes a plurality of spaced apart wheel structures 14. The wheel structures 14 are load bearing and support the driven conveyor chain (not shown). As will be noted in FIGS. 3 and 4, the wheel structures 14 include a pair of spaced apart wheels 16, 18 rotatably supported by a castor structure 20. Rails 22 are provided as part of the conveyor structure. The rails 22 include a bottom wall 24 upon which the wheels 16, 18 roll. The bottom wall 24 defines, with each side wall 26, 28, a generally S-shape. This construction provides a lower rail portion in which the wheels 16, 18 are restrained from escape. The castor structure 20, however, extends through the upper portion of the side walls 26, 28 into connection with a conveyor chain (not shown).

Figure 1:
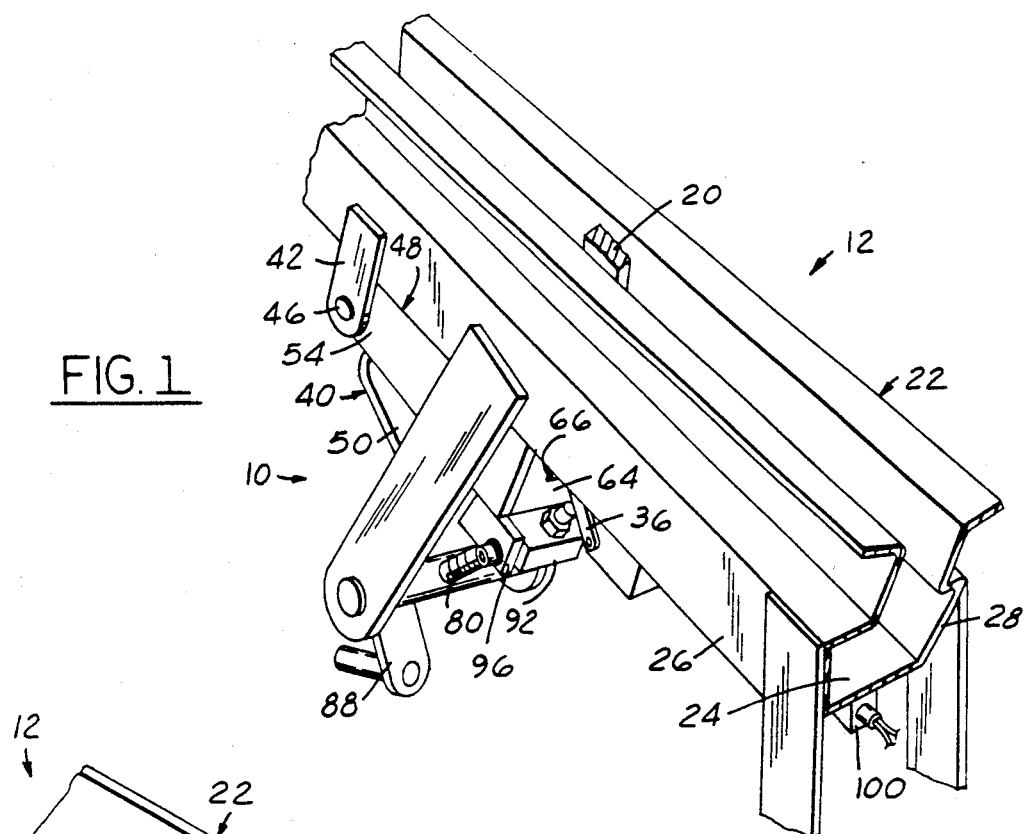
FIG. 1 is a view in perspective of the conveyor anti-runaway apparatus of the present invention mounted on a conveyor rail.
Figure 2:
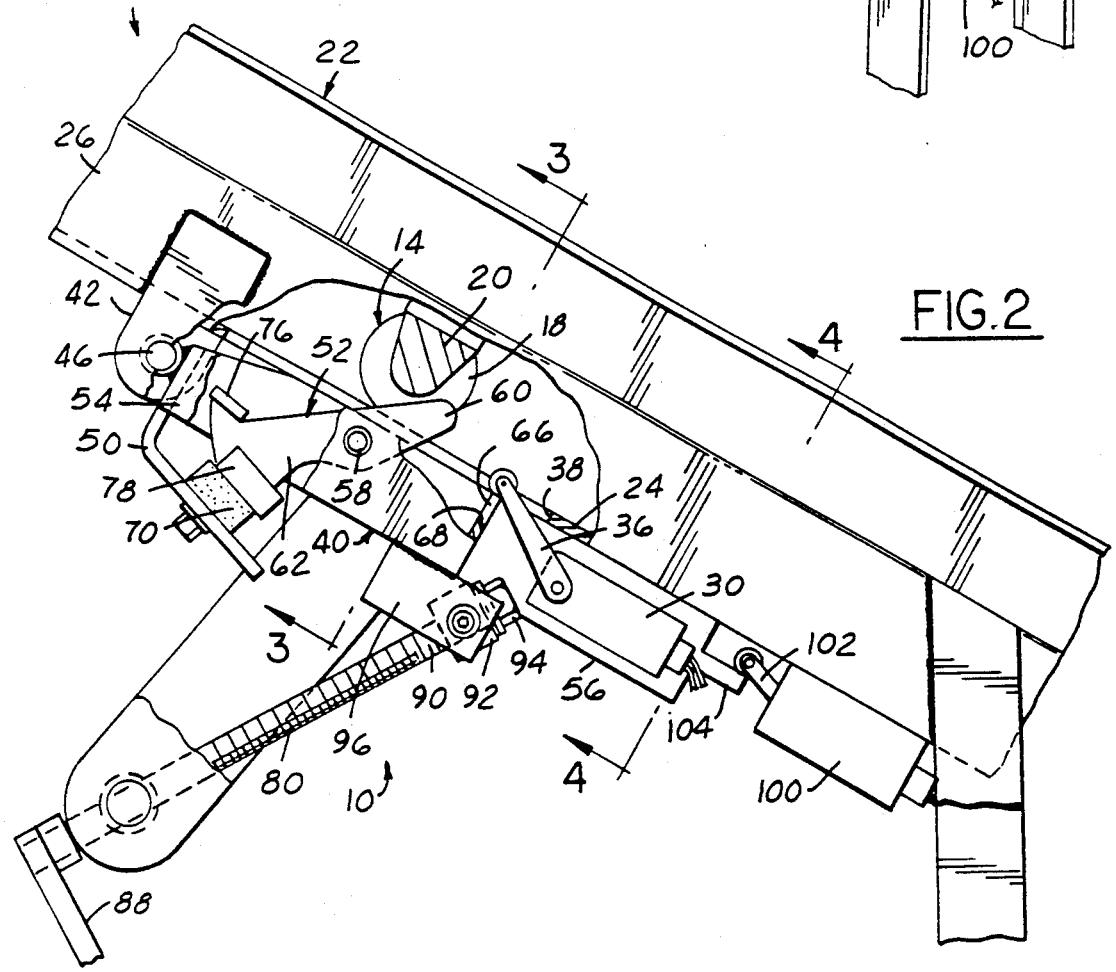
FIG. 2 is a side elevational view of the structure shown in FIG. 1 as seen from the left side with portions broken away for the purpose of clarity.
Figure 5:
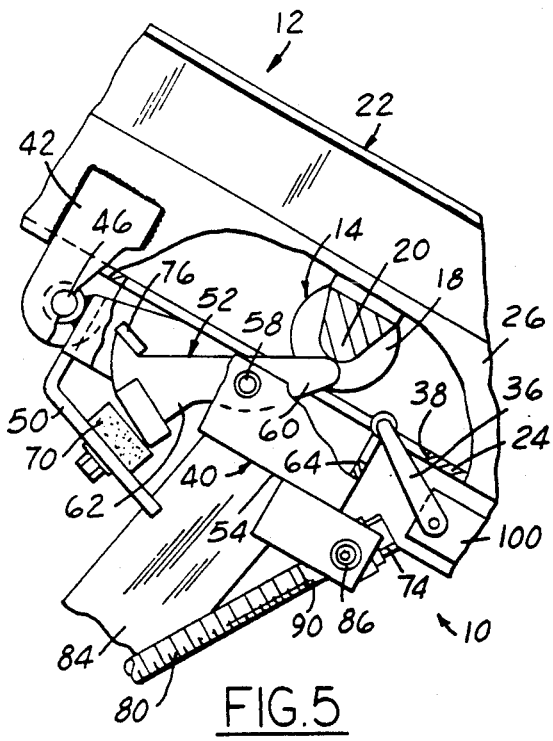
FIG. 5 is a partial view of the structure shown in FIG. 2 illustrating conveyor wheel structure moved into contact with the tripping arm structure of a switch tripping device forming part of the anti-runaway apparatus.
Figures 7, 8, 9:
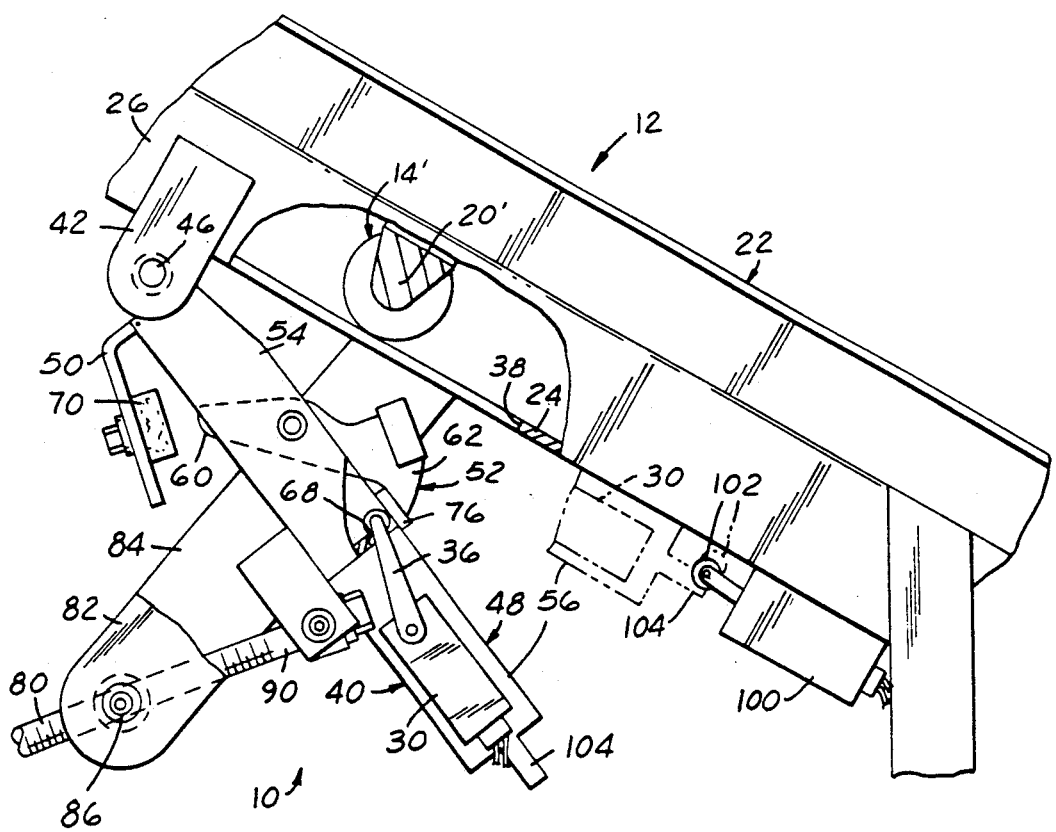
FIG. 7 is a view similar to FIG. 2 illustrating the reset procedure for the anti-runaway apparatus.
FIG. 8 is a view in perspective of the conveyor anti-runaway apparatus as viewed from the upper end of the structure shown in FIG. 1.
FIG. 9 is an electrical schematic diagram showing the conveyor anti-runaway electrical switch connections.

As will be noted in the figures, the conveyor anti-runaway apparatus 10 includes a normally closed electric switch 30. As shown in FIG. 9, the switch 30 is connected between the conveyor electric motor 32 and a source of electrical power 34. The electric switch 30 includes a switch actuator 36 movable between closed and open positions. As shown in FIGS. 2 and 5, the switch actuator 36 is biased towards the closed position wherein the outer end thereof extends through an opening 38 provided in the bottom wall 24 of the rail 22.

A switch tripping device 40 is mounted adjacent the underside of the rail 38. The device 40 includes a pair of spaced apart downwardly depending ears 42, 43 welded to the side walls of the rail 22 and between which rotatably extends a cylindrical element 46. A U-shaped bracket structure 48 including an L-shaped bracket 50 are secured to the cylindrical element 46 as by welding. A tripping arm structure 52 is pivotably mounted between bracket sides 54, 56 by means of a pin 58. The tripping arm structure 52 has an upper segment 60 on one side of the pivot mount pin 58 and a lower segment 62 on the other side of the pivot mount pin 58. The lower segment 62 is configured to produce a greater moment about the pivot mount pin 58 than does the upper segment 60 whereby the tripping arm structure assumes a normal position with the lower segment 62 beneath the upper segment 60 as shown in FIG. 2. This is accomplished by making the lower segment 62 somewhat longer than the upper segment 60 and somewhat heavier at the outer end as will be noted in FIG. 2. The outer end of the upper segment 60 extends through the opening 38 and into the path of the lower portion of the castor structure 20. The switch 30 is mounted between the outer ends of the bracket sides 54, 56. A wall 64 is provided intermediate the ends of the bracket structure 48. A notch 66 is provided in the upper portion of the wall 64 to permit tripping of the switch actuator 36 to open the switch 30 when it is desired to stop the conveyor 12. Movement of the switch actuator 36 is limited by the upper edge 68 of the notch 66.

When the conveyor structure is in motion, the spaced apart wheel structures 14 continually move past the tripping arm structure 52. As will be noted in FIG. 5, each time a wheel structure moves by the tripping arm structure 52, the castor structure 20 bumps the upper segment 60, causing the tripping arm structure 52 to pivot in the clockwise direction as viewed in FIGS. 5 and 6. However, the moment of the lower segment 62 is sufficient to cause the tripping arm structure 52 to return to its normal position each time it is bumped by a wheel structure which is moving at an acceptably low speed. The tripping arm structure 52 will thus move between the normal position illustrated in FIG. 2 to a position such as shown in FIG. 5 and then back to the position shown in FIG. 2. A stop element 70 in the form of a pad is bolted to the L-shaped bracket 50 in a position beneath and in the path of the lower segment 62 when the tripping arm structure 52 assumes its normal position. As will be noted in FIG. 3, the tripping arm structure 52 comprises a pair of spaced apart arm elements 72, 74 which are secured together at their lower ends by means of a tripping plate 76 and also by a stop element 78 which rests on the stop element 70 when the tripping arm structure 52 is in the position illustrated in FIG. 2. The stop element 70 functions to limit downward pivoting of the lower segment 62 to thereby position the tripping arm structure 52 in a desired normal position.

Figure 6:
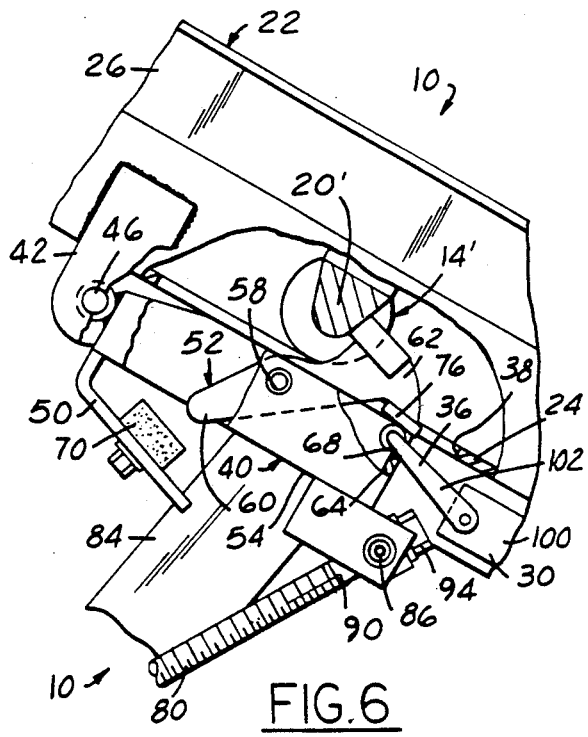
FIG. 6 is a view similar to FIG. 5 illustrating the tripping arm structure pivoted into a tripping position to stop the conveyor.

However, when the conveyor 12 is moving at an unacceptably high speed, referred to as "runaway", it is desired to shut the conveyor down. Of course, when the conveyor is moving at such speeds, the wheel structures 14 will be carried along at the same speeds. Thus, the wheel structures 14 are a suitable measure for speed control. When the wheel structures are moving at an unacceptably high speed, a castor structure 20 will bump the upper segment 60 with sufficient impact to result in the lower segment 62 pivoting entirely around the pivot mount pin 58 into contact with the switch actuator 36. The tripping plate 76 of the lower segment 62 of the tripping arm structure 52 will impinge against the outer end of the switch actuator 36 causing the actuator to move downwardly as shown in FIG. 6 until it contacts the edge 68. At this time, the switch 30 will be open, causing the electric motor 32 to de-energize and stop thus causing the conveyor to come to a halt. The next succeeding castor structure 20' will normally advance enough to impinge against the stop element 78 and jam the switch 30 in the open position thus preventing re-energization of the electric motor 32. The upper segment 60 thereafter functions to block passage of conveyor wheel structures 14 thereby.

Figure 4:
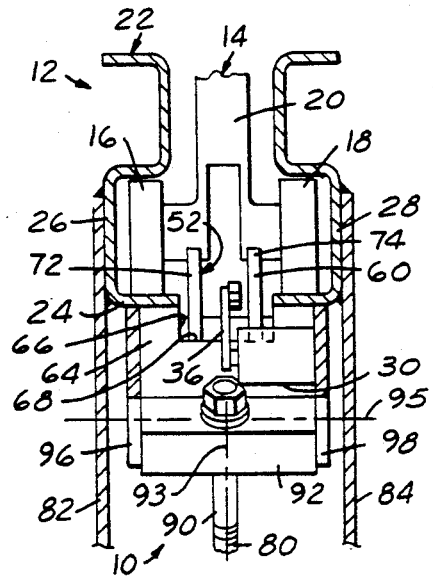
FIG. 4 is a sectional view taken substantially along the line 4—4 of FIG. 2 looking in the direction of the arrows.

Additional structure is provided for quick resetting of conveyor 12 to permit restarting thereof as required. This structure includes a jackscrew 80 and jackscrew support structure. The jackscrew support structure includes a pair of depending arms 82, 84 which are secured to the rail 22 at the upper end thereof as by welding. A cylindrical element 86 extends between the lower ends of the arms 82, 84. The element 86 is pivotally mounted to permit some angular displacement of the jackscrew 80 during actuation thereof. The cylindrical element 86 has an internally threaded opening therein with the jackscrew 80 threadingly extending therethrough. Manually engagable crank means 88 are provided on the lower end of the jackscrew 80. The upper end of the jackscrew 80 has an unthreaded portion 90 which rotatably extends through a box-like collar 92 and is held in place by means of a nut 94 provided on the upper end thereof. The collar 92 extends between a pair of plates 96, 98 which are secured to the underside of the bracket sides 54, 56 as by welding. As shown in FIG. 4, the collar 92 is pivotally mounted on an axis 93 which is at substantially right angles with respect to the axis 95 of the collar 92 so that it may pivot somewhat during actuation of the jackscrew 80 in order to accommodate the changing position of the switch tripping device 40.

When the jackscrew 80 is rotated to pivot the switch tripping device 40 downwardly about the cylindrical element 46 as an axis, the tripping arm structure 52 will move out of engagement with the wheel structure 14' as shown in FIG. 6. The tripping arm structure 52 may then be manually pivoted back to its normal position with the stop elements 70, 78 in abutment. However, this will cause the switch 30 to automatically close, it being remembered that the switch actuator 36 is biased to the closed position. Thus, the conveyor 12 could restart before the switch tripping device 40 is reset. This problem could be avoided by providing a manual reset for the switch actuator 36. However, it is not desired to permit restarting of the conveyor 12 before the switch tripping device 40 is back in place, whether this restart is caused automatically or is permissible manually.

In order to alleviate this problem, a second electric switch 100 is provided. The switch 100 has a second switch actuator 102 which is biased to a normally open position. The second electric switch 100 is mounted on the conveyor rail 22 adjacent to the switch tripping device 40. A second tripping arm 104 is defined by a projection extending from the end of elongated bracket side 56. When the switch tripping device 40 is in its operative position as shown in FIG. 2, the second tripping arm 104 impinges against the second switch actuator 102 causing it to move upwardly and close the switch. However, as shown in FIG. 7, when the switch tripping device 40 is pivoted downwardly so that the arm 104 looses contact with the actuator 102, the actuator 102 will move downwardly as viewed in FIG. 7 thus opening the switch 100. The switch 100 will not close until the switch tripping device 40 is again pivoted upwardly as shown in dotted lines in FIG. 7. As will be noted in FIG. 9, the switch 100 is connected in series with the switch 30. Consequently, when the tripping arm structure 52 is moved out of its wheel structure locking position by actuation of the jackscrew 80, the second switch actuator 102 is biased to the open position thereby preventing application of electric power to the electric motor 32. Restart of the conveyor 12 is thus prevented until such time as the tripping arm structure 52 is pivoted back to its normal position and the jackscrew 80 is actuated to pivot the switch tripping device 40 back to its normal position.

I claim:

1. A conveyor anti-runaway apparatus for a conveyor of the type driven by an electric motor connected to a source of electrical power, the conveyor including a plurality of spaced apart wheel structures along the length thereof which ride on rails, the conveyor anti-runaway apparatus comprising a normally closed electric switch connected between the conveyor electric motor and the source of electrical power, the electric switch including a switch actuator movable between closed and open positions, a switch tripping device mounted adjacent the underside of a conveyor rail, a tripping arm structure, a pivot mount pivotably mounting the tripping arm structure on the switch tripping device intermediate the ends thereof, the tripping arm structure having an upper segment on one side of the pivot mount and a lower segment on the other side of the pivot mount, the lower segment being configured to produce a greater moment about the pivot mount than does the upper segment whereby the tripping arm structure assumes a normal position with the lower segment beneath the upper segment, a portion of the upper segment extending into the path of the conveyor wheel structures to be bumped thereby and pivot each time a wheel structure passes by, the moment of the lower segment being sufficient to cause the tripping arm structure to return to its normal position each time it is bumped by a wheel structure which is moving at an acceptably low speed and insufficient to cause such return when the wheel structure is moving at an unacceptably high speed resulting in the lower segment pivoting entirely around the pivot mount into contact with the switch actuator causing the switch actuator to move to the open position thus interrupting electrical power to the electric motor and causing the conveyor to stop, the lower segment thereafter functioning to block passage of conveyor wheel structures thereby.

2. A conveyor anti-runaway apparatus as set forth in claim 1, wherein the electric switch is mounted on the switch tripping device, the switch tripping device being pivotably mounted on the conveyor rail, jackscrew support structure including an internally threaded opening, the jackscrew support structure depending from said conveyor rail, a jackscrew threadingly extending through said opening, manually engagable crank means provided on one end of the jackscrew, the other end of the jackscrew being rotatably connected to the switch tripping device whereby the tripping arm structure is moveable out of its wheel structure blocking position by actuation of the jackscrew to pivot the switch tripping device away from said conveyor rail so that the tripping arm structure can be manually pivoted back to its initial position to reset the switch tripping device to permit restarting of the conveyor.

3. A conveyor anti-runaway apparatus as set forth in claim 2, wherein said other end of the jackscrew is also pivotably connected to the switch tripping device along an axis at substantially right angles with respect to the axis of said rotatable connection.

4. A conveyor anti-runaway apparatus as set forth in claim 2, wherein a second electric switch is connected in series with the aforementioned electric switch, the second electric switch including a second switch actuator biased to a normally open position, the second electric switch mounted on said conveyor rail adjacent to the switch tripping device, the switch tripping device including a second tripping arm structure, the second tripping arm structure contacting the second switch actuator and closing the second electric switch when the switch tripping device is positioned by the jackscrew adjacent the underside of the conveyor rail, the second tripping arm structure being out of contact with the second switch actuator when the aforementioned tripping arm structure is moved out of its wheel structure blocking position by actuation of the jackscrew whereupon the second switch actuator is biased to the open position thereby preventing application of electric power to the electric motor.

5. A conveyor anti-runaway apparatus as set forth in claim 1, wherein said conveyor rail has an opening therein through which portions of the tripping arm structure project.

6. A conveyor anti-runaway apparatus as set forth in claim 1, wherein the switch tripping device includes a stop element positioned beneath and in the path of the lower segment when the tripping arm structure assumes its normal position, the stop element functioning to limit downward pivoting of the lower segment.

* * * * *